United States Patent
Economidis et al.

(10) Patent No.: US 6,574,364 B1
(45) Date of Patent: Jun. 3, 2003

(54) PIXEL COLOR VALUE ENCODING AND DECODING

(75) Inventors: Nikolaos Economidis, Thessaloniki (GR); David E. Penna, Redhill (GB); Brian Gibson, Forest Row (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/273,284

(22) Filed: Mar. 19, 1999

(30) Foreign Application Priority Data

Mar. 31, 1998 (GB) .............................. 9806767

(51) Int. Cl.[7] .............................................. G06K 9/00
(52) U.S. Cl. ....................................................... 382/166
(58) Field of Search ................................ 382/162–167, 382/232–248; 358/500–540; 348/409.1–420; 345/589–606

(56) References Cited

U.S. PATENT DOCUMENTS

| | | | | |
|---|---|---|---|---|
| 4,760,459 A | | 7/1988 | Sato et al. ................... 358/260 |
| 4,843,466 A | | 6/1989 | Music et al. ................. 358/133 |
| 5,353,132 A | | 10/1994 | Katsuma ..................... 358/539 |
| 5,467,134 A | * | 11/1995 | Laney et al. .............. 348/409.1 |
| 5,625,712 A | * | 4/1997 | Schoenzeit et al. .......... 382/232 |
| 6,014,464 A | * | 1/2000 | Kurzweil et al. ........... 382/233 |
| 6,035,059 A | * | 3/2000 | Kurosawa et al. .......... 382/164 |
| 6,205,255 B1 | * | 3/2001 | Mak ........................... 382/166 |
| 6,259,810 B1 | * | 7/2001 | Gill et al. ................... 382/166 |
| 6,301,389 B1 | | 10/2001 | Penna et al. ................ 382/232 |

FOREIGN PATENT DOCUMENTS

WO    WO9625010    8/1996    ........... H04N/11/04

OTHER PUBLICATIONS

"Principles of Interactive Computer Graphics" by William M. Newman et al; International Studen Edition, 1979, pp 287–289, McGraw–Hill, ISBN 0–07–066455–2.

* cited by examiner

Primary Examiner—Jingge Wu
(74) Attorney, Agent, or Firm—Edward W. Goodman

(57) ABSTRACT

A technique for encoding pixel color values for a full or partial digital video image frame has each different color within the image being assigned a color value. The most common one of the colors (0) within the frame or frame segment is identified, and runs of at least three successive pixels of that predominant color are encoded as a first code (00) indicating a run and a second code indicating the run length (LL). Runs of successive pixels having a color (1, 2, 3) other than the predominant color (0) are encoded as successive iterations of a code containing only the respective color value when the run length is less than or equal to a threshold value and as a first code indicating a run (00), a second code indicating a run length (LL), and a third code (CC) identifying the color value when the threshold value is exceeded.

9 Claims, 3 Drawing Sheets

| CODE | COLOUR C | LENGTH (PIXELS) |
|---|---|---|
| 01 | 1 | 1 |
| 10 | 2 | 1 |
| 11 | 3 | 1 |
| 00 01 | 0 | 1 |
| 00 00 01 | 0 | 2 |
| 00 1L LL | 0 | 3 - 10 |
| 00 00 1L LL | 3 | 4 - 11 |
| 00 00 00 10 LL LL CC | CC | 13 - 28 |
| 00 00 00 11 LL LL LL LL CC | CC | 30 - 285 |
| 00 00 00 00 | SAME AS PREVIOUS | TO LINE END |
| 00 00 00 01 | (AS STORED) | (AS STORED) |

PIXEL COLOR VALUE ENCODING AND DECODING

The present invention relates to the encoding and decoding of whole or partial digital video image frames, where a partial frame may be in the form of a graphic overlay on a full motion video (FMV) image, and particularly to the coding of pixel color values.

A known technique for pixel color value encoding is run length coding. The technique allows sets of adjacent pixel values to be coded more compactly by specifying the color once and then the count of the number (n) of identical pixels instead of repeating the color code (n) times. Further information about run length coding may be found in, for example, "Principles of Interactive Computer Graphics" by W M Newman and R F Sproul, International Student Edition, 1979, pp 287–289, pub McGraw-Hill, ISBN 0-07-066455-2.

An example of an encoding and decoding system making use of run length coding to reduce the necessary volume of data to code whole or partial image frames is given in International patent application WO 96/25010 commonly assigned with the present application. In the example, a method is described of encoding pixel color values for a digital video image frame in which each of up to 15 different colors within the image is assigned a color value. A predominant color (i.e. the most commonly occurring pixel color value) is identified for the image frame and, in a first embodiment, each pixel having one of the 14 colors other than the predominant color is separately coded simply identifying its respective color value (the codes 0010 to 1111 being used), with runs of three or more successive pixels of the predominant color being run-length encoded. A further code (0000 0011 followed by a four bit color code), similar in arrangement to that indicating a run, is provided to allow a change in the specified predominant color during the course of a frame. In a further embodiment, runs of all colors are run-length encoded but with a shorter coding scheme for runs of the predominant color or, in a still further embodiment, a small range of predominant colors.

A principle use for these coding schemes is to improve efficiency of coding for certain classes of image material, in particular subtitling or other text boxes to be displayed overlaid on a video image. For such applications, the particular aim is to achieve at least a reasonable degree of compression without incurring large overheads due to complexity. For the particular case of recorded video, where the subtitling or other data may be stored as, for example, a separate file on an optical disc, the requirement for compression increases due to the limitations of available storage space whilst efficiency must not be degraded to the point where decoding and regeneration of the data becomes a significant factor affecting playback performance.

It is accordingly an object of the present invention to provide a coding methodology for pixel color values which provides good compression without causing undue delays in decoding.

It is a further object to provide a means for encoding and decoding according to such a methodology.

In accordance with the present invention there is provided a method of encoding pixel color values for a digital video image frame in which each different color within the image is assigned a color value, wherein a predominant color is identified for the image frame, and runs of at least three successive pixels of the predominant color are encoded as a first code indicating a run and a second code indicating the run length; characterised in that runs of successive pixels having a color other than the predominant color are encoded as successive iterations of a code containing only the respective color value when the run length is less than or equal to a threshold value and as a first code indicating a run, a second code indicating a run length, and a third code identifying the color value when the threshold value is exceeded.

As will become apparent hereinafter, the present invention is optimised for limited color schemes and especially for the coding of text blocks, although it is not limited to such. In an embodiment to be described, four different colors including the predominant color may be supported with each pixel having a color other than the predominant color being separately coded as a 2-bit code: the predominant color is likely but not certain to be a background color and the three remaining colors may be respectively assigned to foreground and to two intermediate levels between foreground and background for the purposes of anti-aliasing. By keeping the non-predominant color codes short, the repetitive iterations for short to medium length runs (i.e. below the threshold—which threshold may differ for different colors) do not generate an excessive bit load.

For increased savings, one of the colors other than the predominant color may be selected, with a range of run lengths between minimum and maximum values being specified for that color, wherein: runs of the selected color below the minimum value are coded as separate iterations of the color code; runs of the selected color between the minimum and maximum values are coded as a first code indicating a run of that color and a second code indicating the length; and runs of the selected color above the maximum value are coded as a first code indicating a run, a second code indicating a run length, and a third code identifying the color value of the selected color. With this shortened code for short to medium runs (e.g. 4 to 11 pixels) in what may be the text color for subtitling applications for example, the present applicants have found that further bit-savings. of up to 5% in relation to the Digital Video Broadcast 2-bit coding standard may be achieved.

In a practical arrangement, all codes for a pixel or a run preferably comprise an integer number of bit-pairs for ease of decoder implementation. A further code may be provided, wherein subsequent to the placing of the further code in a stream of pixel color codes, the color specified for the immediately preceding pixel is applied to all further pixels to the end of a display line. This further code is suitably only used if run-length specification of the remainder of the line or repeated iterations of the color code per pixel do not require fewer bits to specify, that is to say if the further code is the most economical option.

A still further code may be provided in a stream of pixel color codes, with the code identifying to a host decoder a predetermined and stored pattern of pixel color values to be called up and applied to the following pixels.

Also in accordance with the present invention there is provided video image encoding apparatus arranged to encode pixel color values for a digital video image frame by assigning to each different color within the image a respective color value, wherein a predominant color is identified for the image frame; characterised in that the apparatus includes means arranged to identify runs of successive pixels having a color other than the predominant color and encode the same as successive iterations of a code containing only the respective color value when the run length is less than or equal to a threshold value and as a first code indicating a run, a second code indicating a run length, and a third code identifying the color value when the threshold value is exceeded.

Further in accordance with the present invention there is provided a video image signal comprising encoded frames of pixel color values, a storage medium carrying such a video image signal, and video image playback apparatus as defined in the attached claims, the disclosure of which is incorporated herein and to which reference should now be made.

Preferred embodiments of the present invention will now be described, by way of example only, and with reference to the accompanying drawings in which.

Figure 1:
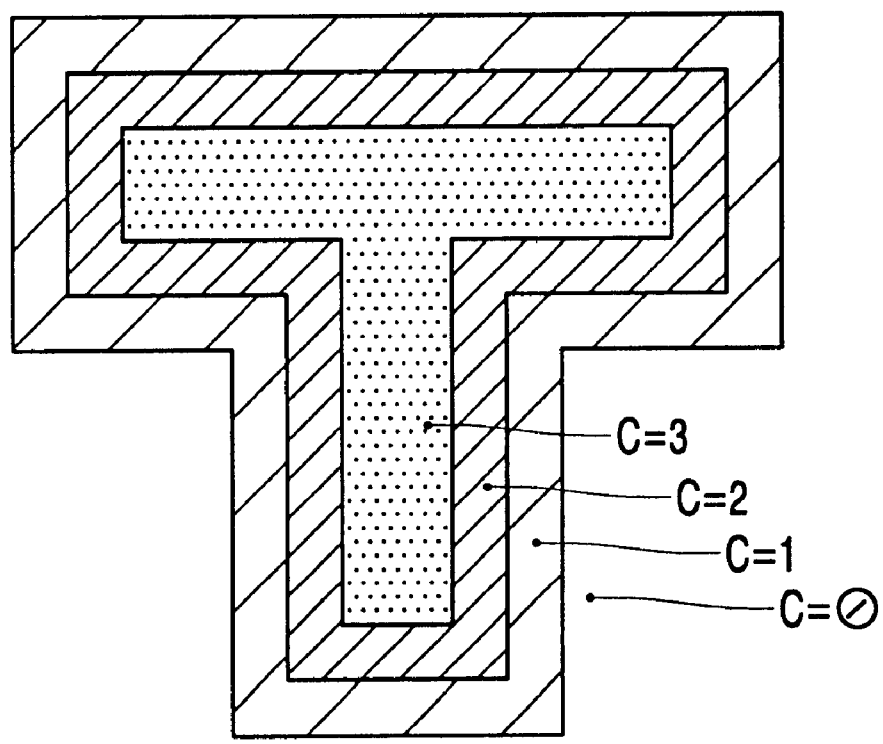
FIG. 1 shows a three color screen icon on a background of a fourth (predominant) color.

Beginning with FIG. 1, this schematically represents a text character formed by pixels of a given color on a background of pixels of a second color. Around the character, two concentric bands of pixels are shown: whilst these bands may be in contrasting colors to the foreground and/or the background, it is preferred for simple subtitling and captioning purposes that they be differently proportioned mixes of foreground and background (for example 70% background to 30% foreground for one of them with the proportions reversed for the other) to enable at least crude anti-aliasing at boundaries between blocks of foreground and background pixels. As will be well understood, this is of particular value where the edge of characters do not coincide with pixel boundaries which could result in "staircase" effects on sloping edges if some degree of foreground/background mixing is not used.

In the following description, this color arrangement will be concentrated upon, with the background identified as color (C) "0", the two anti-aliasing colors identified as respectively color "1" and color "2", and the foreground color of the character as color "3".

The basis for the selection of the particular codes (to be described below with reference to the table of FIG. 6) is to take account of the likelihood of pixel color runs in terms of likely length and frequency for each of the four colors in dependence on the subject matter encoded. As previously mentioned, a particular concern is for subtitling or captioning boxes where the box will generally comprise a rectangle of the background color within which text messages printed in the foreground color appear. FIGS. 2 to 5 show the result of tests over subtitling texts featuring Chinese and Latin characters of various font sizes with distribution of run-lengths of the four colors 0, 1, 2, and 3 indicated in respective ones of the Figures.

Figure 2:
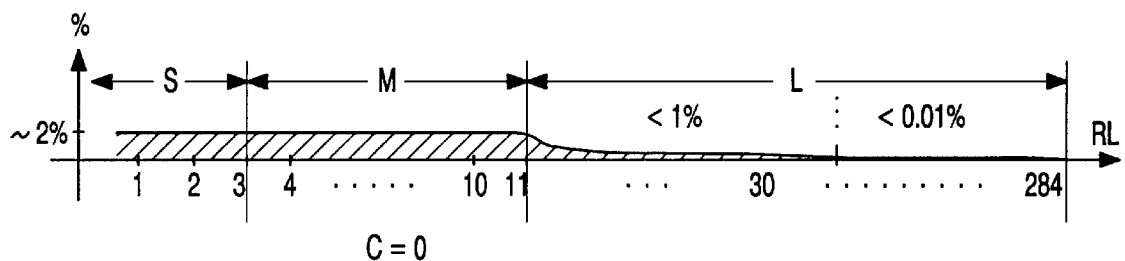
FIGS. 2 to 5 represent respective proportions of the number of per image pixel color runs for differing run lengths and for each of the four colors of FIG. 1.

For each of these Figures, the vertical axis represents the percentage of the total number of pixel runs in all colors for the image or coded segment, and the horizontal axis represents run length in pixels, up to a maximum length of 284 pixels. This horizontal axis is subdivided into three consecutive ranges for run length, with short runs from 1 to 3 pixels in length, medium runs from 4 to 11 pixels length, and long runs from 12 to 284 pixels. As shown by FIG. 2, there is a fairly constant distribution for background pixel runs of from 1 to around 10 or 11 pixels (short and medium runs), each representing around 2% of the total runs. For long runs, those of up to around 30 to 35 pixels each represent less than 1% of the total, with the remainder of the long range (up to 284) covering less than 0.01%.

Figure 3:
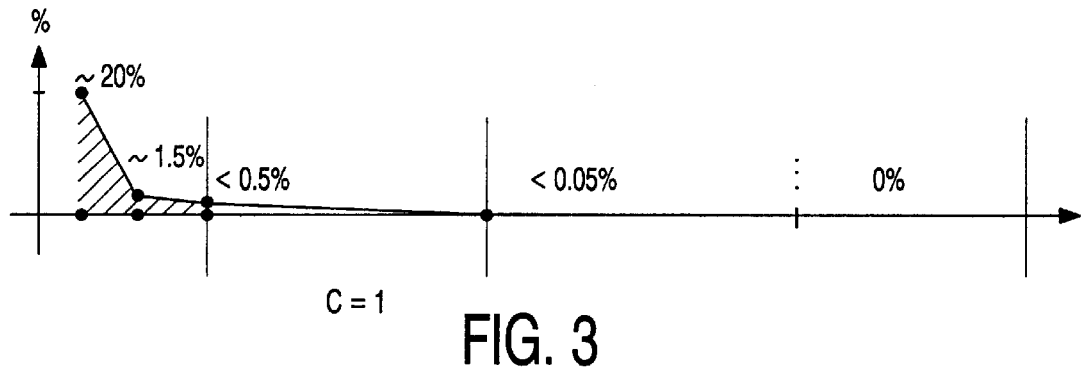
Figure 4:
Figure 5:
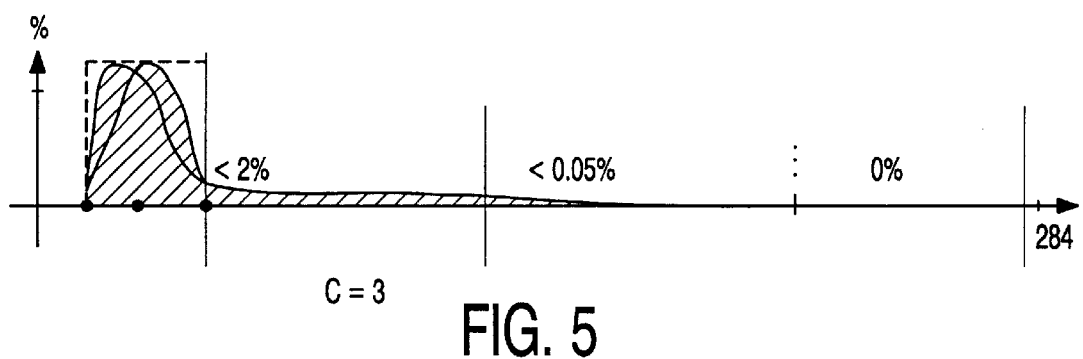

For the anti-aliasing colors 1 and 2 of FIGS. 3 and 4 respectively, the pattern is substantially the same for both, with single pixels representing about 20% of the total runs, dropping to around 1.5% for runs of two pixels, to below 0.5% for medium runs, to below 0.05% for runs in the range 12 to around 35 pixels, and substantially zero for any runs greater than this length. For the foreground color 3, as shown in FIG. 5 the pattern begins with a peak at around 22% in the short run range: the level of this peak remains largely constant although (as shown) its location along the run length axis may vary in dependence on factors such as the font size. After this initial peak, the pattern drops to around 2% for mid-range runs and long runs dropping to zero as for the anti-aliasing colors of FIGS. 3 and 4.

In known schemes such as that of the proposed digital video broadcast (DVB) standard, it is assumed that the runs in the medium range have equal probabilities of occurrence for all colors. The present applicants have recognised that the background and the foreground colors occur far more often than the anti-aliasing ones and in the present scheme they are treated as "preferred" colors. Thus they are given separate codewords of smaller size to encode their run-length only and not their color value (as is done in DVB 2-bit schemes).

Another characteristic of the present scheme is that short runs of the colors that predominate in the short runs, that is to say colors 1, 2, and 3, are coded as successive iterations of their color value, whereas the background color 0 which is predominant in all other regions has separate codewords for each case.

Figures 6, 7:
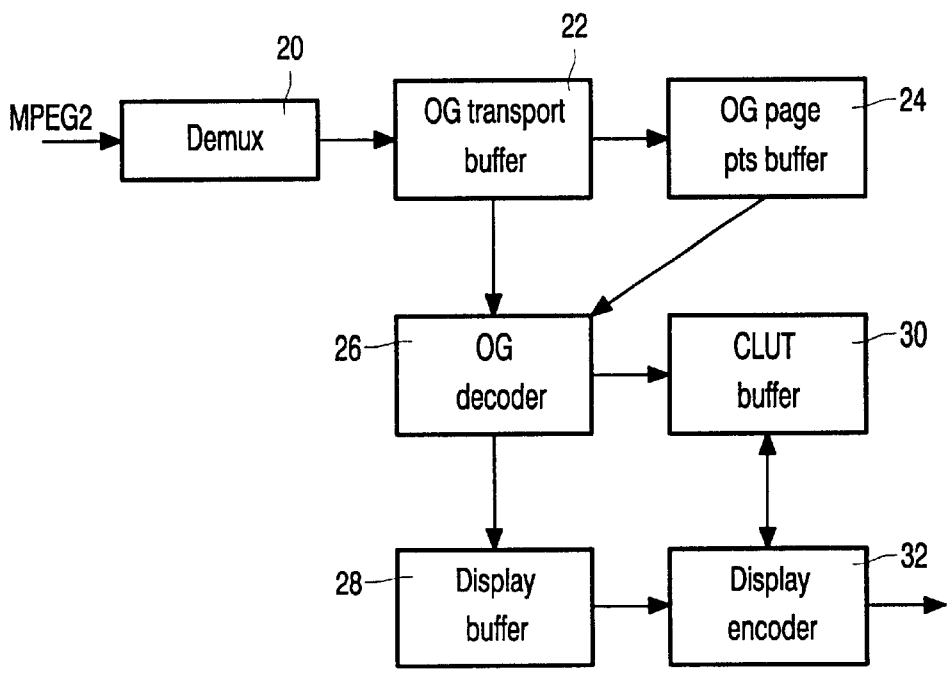
FIG. 6 is a table of color and run codes allocated according to an embodiment of the present methodology.
FIG. 7 is a block schematic diagram of part of a receiver device for decoding for display screen messages encoded using the scheme of FIG. 6.

The detailed encoding scheme is as shown in the table of FIG. 6 and provides short (2-bit) codes for the non-predominant colors: as these are more likely to appear as single or repeated iterations, it produces a saving to give these a shorter code than the four bits used to code a single pixel of the predominant color and six bits used to encode a pair of these pixels. As previously mentioned, the background and foreground colors 0, 3, are preferred and respective codes are provided to code runs of each in the medium range, with common further codes distinguished only by the addition of the pixel color code to specify runs of any pixel in the long range. These codewords that can provide long runs of any of the colors permit encoding at minimum cost for possible occurrences of border lines around the text.

As shown in the penultimate row of FIG. 6, the scheme provides a codeword to denote an end-of-line if other codewords cannot accommodate all the pixels until the end of scan line efficiently enough. In other words, where the same pixel color is specified to the end of a scanline, the code "00 00 00 00" will be used if this takes less space than a sequence of color code iterations or the specification of a run termination at the last scanline pixel.

As an option, one extra codeword (the last row of FIG. 6) is available to encode, if needed, one predetermined (and stored) pattern of colors. Such a pattern is preferably long to provide savings from specifying it as a block and preferably occurs relatively frequently in a particular whole or partial picture frame for which it is selected.

A particular feature of this scheme is that it can be efficiently read by the decoder because all codes are multiples of 2-bits in length and each decision in a decoding tree can be made from reading 2 bits at a time: systems that try to read an odd number of bits at a time suffer because of difficulties of extraction from the storage medium. This happens because the decoder must make a more laborious bit selection out of each codeword. Methods that extract 2, 4 or 8 bits at a time have been found by us to be more efficient.

A block schematic diagram of a part of a decoder apparatus for handling overlay graphics (OG) coded according to the present scheme is shown in FIG. 7. The input to the apparatus is an MPEG2 program stream which is passed to a demultiplexer 20. Following a selection process in the demultiplexer, a stream of subtitle data packets are output to a transport buffer 22 with timing data being passed straight through and into a further buffer 24. From the transport buffer 22, the undecoded data is passed to a 20 decoder stage 26 where it is decoded and separated into basic overlay graphics codes (as in FIG. 6) which are supplied to a display buffer 28, and detailed specification of the colors cross-referenced by means of a color look-up table (CLUT) to the 2-bit color codes, which specification is downloaded to CLUT buffer 30. The final stage is a display encoder 32 which takes the data from the display buffer 28 and, by reference to the CLUT in buffer 30, generates to subtitle display images to be mixed with other images such as in the form of an overlay to a full-motion video sequence.

From reading the present disclosure, other modifications will be apparent to persons skilled in the art. Such modifications may involve other features which are already known in the field of video signal encoding systems and devices and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

What is claimed is:

1. A method of encoding pixel color values for a digital video image frame, said method comprising the steps:
   assigning a color value to each different color within the image;
   identifying a predominant color for the image frame; and
   encoding runs of at least three successive pixels of the predominant color as a first code indicating a run and a second code indicating the run-length,
   characterized in that said method further comprises the step:
   encoding runs of successive pixels having a color other than the predominant color as successive iterations of a code containing only the respective color value when the run-length is less than or equal to a threshold value, and as a first code indicating a run, a second code indicating a run-length, and a third code identifying the color value when the threshold value is exceeded,
   wherein said method further comprises the steps:
   selecting one of the colors other than the predominant color; and
   specifying a range of run-lengths between minimum and maximum values for that color, wherein:
   runs of the selected color below the minimum value are coded as separate iterations of the color code;
   runs of the selected color between the minimum and maximum values are coded as a first code indicating a run of that color and a second code indicating the length; and
   runs of the selected color above the maximum value are coded as a first code indicating a run, a second code indicating a run-length, and a third code identifying the color value of the selected color.

2. The method as claimed in claim 1, wherein the range of run-lengths is from 4 to 11 pixels.

3. The method as claimed in claim 1, wherein all codes for a pixel or a run comprise an integer number of bit-pairs.

4. The method as claimed in claim 1, wherein different respective threshold run-lengths are assigned to different colors.

5. The method as claimed in claim 1, wherein a further code is provided, and wherein subsequent to the placing of the further code in a stream of pixel color codes, a predetermined and stored pattern of pixel color values is called up and applied to the following pixels.

6. A method of encoding pixel color values for a digital video image frame, said method comprising the steps:
   assigning a color value to each different color within the image;
   identifying a predominant color for the image frame; and
   encoding runs of at least three successive pixels of the predominant color as a first code indicating a run and a second code indicating the run-length,
   characterized in that said method further comprises the step:
   encoding runs of successive pixels having a color other than the predominant color as successive iterations of a code containing only the respective color value when the run-length is less than or equal to a threshold value, and as a first code indicating a run, a second code indicating a run-length, and a third code identifying the color value when the threshold value is exceeded,
   wherein four different colors including the predominant color are supported and each pixel having a color other than the predominant color is separately coded as a 2-bit code, and wherein the predominant color is a background color and the three remaining colors are respectively assigned to foreground and to two intermediate levels between foreground and background for the purposes of anti-aliasing.

7. A method of encoding pixel color values for a digital video image frame, said method comprising the steps:
   assigning a color value to each different color within the image;
   identifying a predominant color for the image frame; and
   encoding runs of at least three successive pixels of the predominant color as a first code indicating a run and a second code indicating the run-length,
   characterized in that said method further comprises the step:
   encoding runs of successive pixels having a color other than the predominant color as successive iterations of a code containing only the respective color value when the run-length is less than or equal to a threshold value, and as a first code indicating a run, a second code indicating a run-length, and a third code identifying the color value when the threshold value is exceeded,
   wherein a further code is provided, wherein subsequent to the placing of the further code in a stream of pixel color codes, the color specified for the immediately preceding pixel is applied to all further pixels to the end of a display line, and wherein said further code is only used if run-length specification of the remainder of the line or repeated iterations of the color code per pixel do not require fewer bits to specify.

8. A video image encoding apparatus for encoding pixel color values for a digital video image frame, said video image encoding apparatus comprising:

means for assigning a respective color value to each different color within the image a respective color value;

means for identifying a predominant color for the image frame;

means for identifying runs of successive pixels having a color other than the predominant color; and means for encoding said identified runs of successive pixel as successive iterations of a code containing only the respective color value when the run-length is less than or equal to a threshold value, and as a first code indicating a run, a second code indicating a run-length, and a third code identifying the color value when the threshold value is exceeded, wherein said video image encoding apparatus further comprises:

means for selecting one of the colors other than the predominant color; and means for specifying a range of run-lengths between minimum and maximum values for that color, wherein:

runs of the selected color below the minimum value are coded as separate iterations of the color code;

runs of the selected color between the minimum and maximum values are coded as a first code indicating a run of that color and a second code indicating the length; and runs of the selected color above the maximum value are coded as a first code indicating a run, a second code indicating a run-length, and a third code identifying the color value of the selected color.

9. A storage medium having a video image signal stored therein, said video image signal comprising encoded frames of pixel color values, wherein runs of two or more successive pixels of a predetermined predominant color for the frame are encoded in the form of a first code word indicating a run and a second code word indicating the run-length;

characterized in that runs of successive pixels having a color other than the predominant color are encoded as successive iterations of a code containing only the respective color value when the run length is less than or equal to a threshold value and as a first code indicating a run, a second code indicating a run-length, and a third code identifying the color value when the threshold value is exceeded, wherein one of the colors other than the predominant color is selected; and a range of run-lengths between minimum and maximum values for that color is specified, wherein:

runs of the selected color below the minimum value are coded as separate iterations of the color code;

runs of the selected color between the minimum and maximum values are coded as a first code indicating a run of that color and a second code indicating the length; and runs of the selected color above the maximum value are coded as a first code indicating a run, a second code indicating a run-length, and a third code identifying the color value of the selected color, said storage medium further having stored therein initialization data including a look-up table specifying the color represented by each code including said predetermined predominant color.

* * * * *